(12) United States Patent
Ishikura

(10) Patent No.: US 7,304,661 B2
(45) Date of Patent: Dec. 4, 2007

(54) VEHICLE PERIPHERY MONITORING APPARATUS

(75) Inventor: Masayuki Ishikura, Aichi (JP)

(73) Assignees: Autonetworks Technologies, Ltd., Mie (JP); Sumitomo Wiring Systems, Mie (JP); Sumitomo Electric Industries, Ltd., Osaka (JP)

( * ) Notice: Subject to any disclaimer, the term of this patent is extended or adjusted under 35 U.S.C. 154(b) by 827 days.

(21) Appl. No.: 10/730,912

(22) Filed: Dec. 10, 2003

(65) Prior Publication Data

US 2004/0114039 A1 Jun. 17, 2004

(30) Foreign Application Priority Data

Dec. 11, 2002 (JP) .............................. 2002-359158
Apr. 17, 2003 (JP) .............................. 2003-112466

(51) Int. Cl.
*H04N 7/18* (2006.01)

(52) U.S. Cl. ....................................... 348/143; 348/148

(58) Field of Classification Search ................ 348/143, 348/148, 373; 353/74
See application file for complete search history.

(56) References Cited

U.S. PATENT DOCUMENTS 6,412,952 B1 * 7/2002 Jung .............................. 353/74
2002/0057360 A1 * 5/2002 Abe et al. .................... 348/373

FOREIGN PATENT DOCUMENTS

JP    A 2001-122020    5/2001
JP    A 2002-46531     2/2002

* cited by examiner

*Primary Examiner*—Allen Wong
(74) *Attorney, Agent, or Firm*—Oliff & Berridge, PLC

(57) ABSTRACT

A case of the vehicle periphery monitoring apparatus to be mounted on a vehicle includes a front case member formed of transparent resin including a transparent window, and a rear case member joined and detachably fixed to the front case member. A cover member for covering the front case member except for the transparent window and covering the periphery of a mating surface between the front case member and the rear case member is further provided.

11 Claims, 10 Drawing Sheets

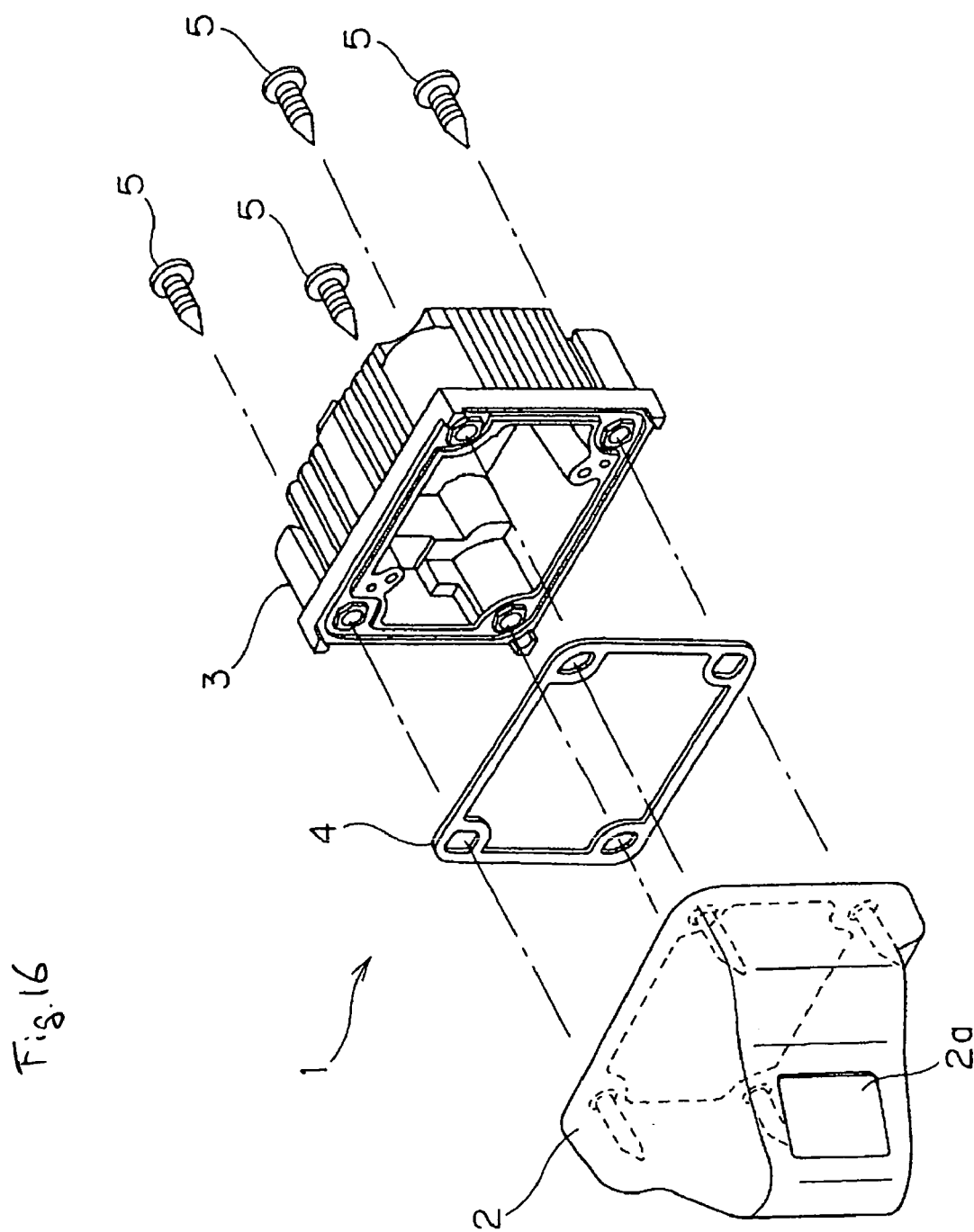

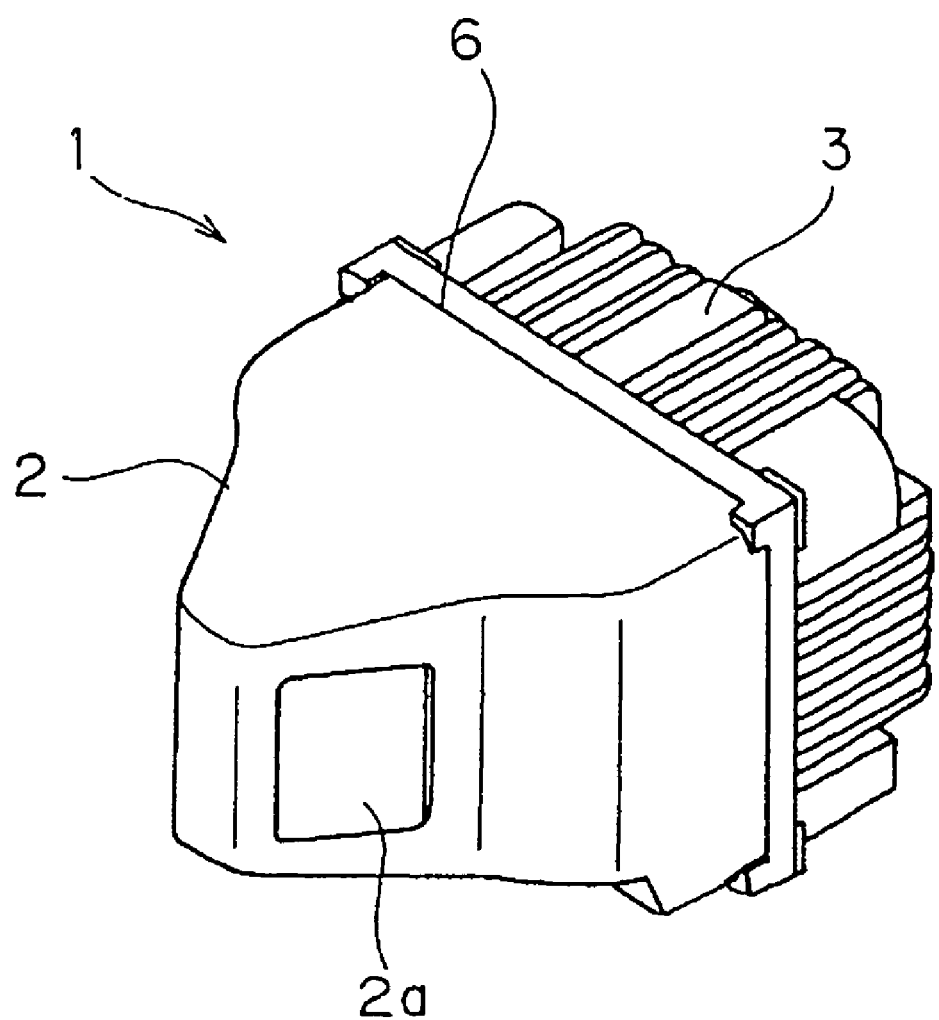

VEHICLE PERIPHERY MONITORING APPARATUS

BACKGROUND OF THE INVENTION

1. Field of the Invention

The present invention relates to a vehicle periphery monitoring apparatus mounted to a vehicle such as a vehicle for picking up an image of a blind spot being out of the driver's visual field in the periphery of the vehicle.

2. Description of the Related Art

When a vehicle is approaching an intersection, it is necessary to confirm safe condition on left and right sides. However, at the intersection where the sight visibility on the left side and the right side is poor or where traffic lights are not equipped, the driver has to advance the vehicle into the intersection to some extent to confirm safe condition on the left side and the right side.

Therefore, care should be taken when advancing the vehicle into the intersection as described above, and after having entered therein, the driver has to view directly the left side and the right side respectively to confirm safe condition, which has been a mental burden for the driver.

Therefore, in these years, in order to alleviate the above-described burden, there is proposed a so-called vehicle periphery monitoring apparatus for supporting the driver by picking up the left and the right views on both sides of the vehicle by an image pickup device such as a CCD camera, which is mounted to a front grill or on a bumper of the vehicle, and displaying information on left and right images on both sides of the vehicle on a display device such as a LCD (liquid crystal display), which is installed in the interior of the vehicle (for example, see JP-A-2001-122020 and JP-A-2002-046531).

An apparatus disclosed in JP-A-2001-122020 has a differentiated configuration having a cover of an ideological form, such as characters, for covering the image pickup device. An apparatus disclosed in JP-A-2002-046531 has a configuration in which the design of the vehicle is preserved by providing an external cover for covering the distal end portion of the image pickup device.

According to the vehicle periphery monitoring apparatus as described above, since it is necessary to dispose an image pickup device such as the CCD camera, or an optical system equipment such as a reflection mirror or a prism for guiding outside views into the image pickup unit in a case, and thus a case configured of two halves is generally used.

For example, as shown in FIGS. 16 and 17, a case 1 includes a front case member 2 and a rear case member 3, and the front case member 2 and the rear case member 3 are adapted to be detachably secured with respect to each other by fastening screws 5 or the like with the intermediary of a packing 4.

In addition, in order to pick up left and right views, for example, the front case member 2 is provided with transparent transparent windows 2a for transmitting light beam on both sides thereof, and the portion other than the transparent windows 2a is light shielded by a color coating so as to prevent excessive light beam from coming into the interior of the case 1.

In this case, when employing the configuration in which the transparent windows 2a formed of transparent material and remaining portion of the front case member 2 formed of material having light shielding property are joined with respect to each other, water proof at the joint portion have to be taken into consideration.

Therefore, by forming the front case member 2 by itself of transparent resin material and coating the portion other than the transparent windows 2a with a color to secure the light shielding property, it is not necessary to take water proof at the portion around the transparent windows 2a into account. In this case, the color coating may be selected so as to match the member or the grill of the vehicle.

In this case, when applying the color coating material on the front case member 2, masking for preventing the coating from attaching to the transparent windows 2a is required. However, masking has a problem in that significant time and labor are required and thus cost increase is resulted.

In addition, it is necessary to apply a hardcoating material especially from the viewpoint of prevention of scratching on the transparent windows 2a. However, since the process of applying the hardcoating material is carried out after the color coating process, when defective application of the hardcoating material occurred in the downstream process, articles, which have been nondefectives in the upstream process, have to be scrapped. This results in yield loss and thus leads to increase in the cost.

In addition, since the coefficient of thermal expansion of the color coating material differs from that of the hardcoating material, cracking or peeling may be occurred in the coating material and the hardcoating material due to repetitive significant variations in temperature.

Furthermore, when scratches or cracks occurred on the front case member 2 during manufacture or after completion due to contact or collision of other member with the front case member 2 exposed toward the outside, the front case member 2 has to be replaced, and when it is secured by the screws 5, replacement will need significant time and labor.

Moreover, when a mating surface 6 between the front case member 2 and the rear case member 3 is directly exposed to high-pressure water during high-pressure washing of the vehicle, water might enter through a mating surface 6.

SUMMARY OF THE INVENTION

It is therefore an object of the invention to provide a vehicle periphery monitoring apparatus that solves the problems described above.

In order to achieve the object, according to one aspect of the invention, there is provided a vehicle periphery monitoring apparatus for picking up an image of the periphery of a vehicle, including: a case configured to be mounted on the vehicle and includes a front case member having a transparent window and a rear case member attached to the front case member; an image pickup device provided within the case and configured to pick up an image of the periphery of the vehicle and to provide the image picked up into a cabin of the vehicle; and a cover member configured to cover the front case member except for the transparent window and to cover a periphery of a mating surface between the front case member and the rear case member.

BRIEF DESCRIPTION OF THE DRAWINGS

The objects and advantages of the present invention will become more apparent by describing preferred embodiments thereof in detail with reference to the accompanying drawings, wherein:

FIG. 16 is an exploded perspective view of the related art; and

FIG. 17 is a perspective view of the same in an assembled state.

DETAILED DESCRIPTION OF THE PREFERRED EMBODIMENTS

Referring now to the accompanying drawings, a description will be given in detail of preferred embodiments of the invention.

Figure 1:
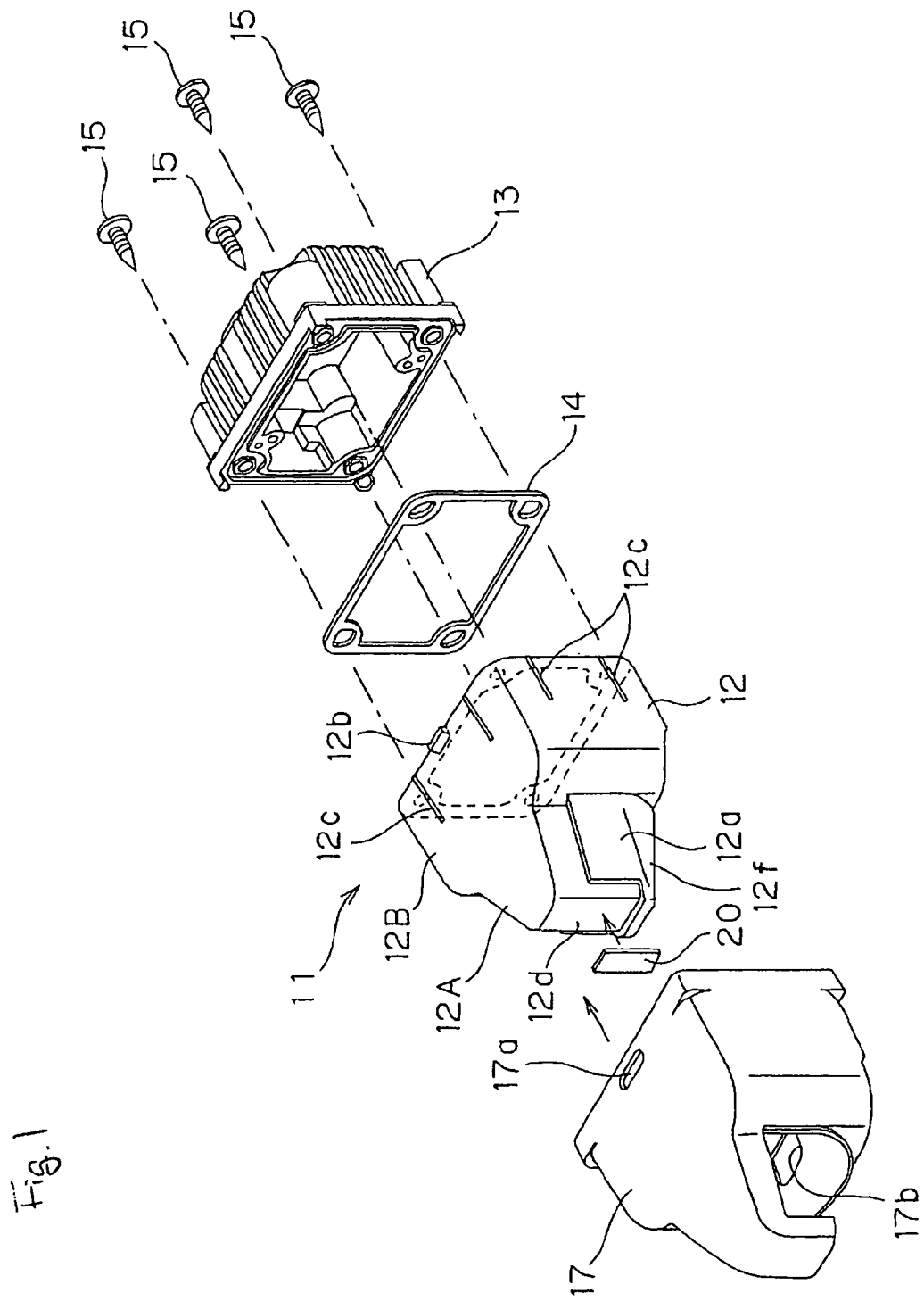
FIG. 1 is an exploded perspective view of the principal portion of a vehicle periphery monitoring apparatus according to a first embodiment of the present invention.

Hereinafter, a first embodiment of the present invention will be described. As shown in FIG. 1, a vehicle periphery monitoring apparatus includes a case 11 for storing image pickup device including a CCD camera for picking up an image of the periphery of a vehicle and an optical system equipment for guiding the outside view to the image pickup device. The case 11 includes a front case member 12 and a rear case member 13. The front case member 12 and the rear case member 13 are adapted to be detachably secured with respect to each other by fastening screws 15 with the intermediary of a packing 14.

Provided on both sides of a gradually tapered front half portion 12A of the front case member 12 are substantially rectangular transparent windows 12a for picking up the views on both sides around the vehicle.

Figure 7:
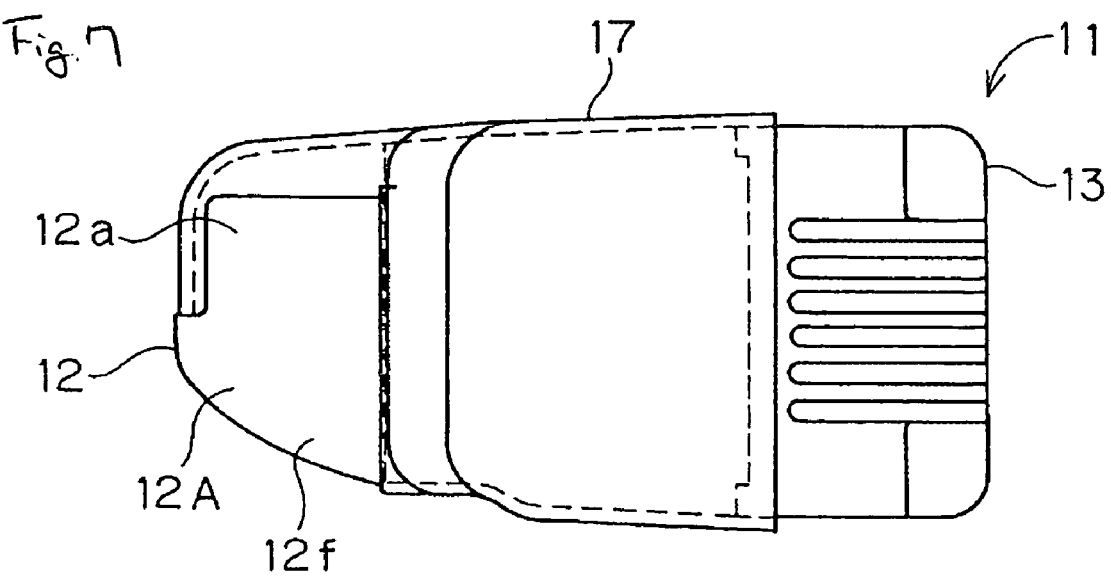
FIG. 7 is a side view of the third embodiment.
Figure 8:
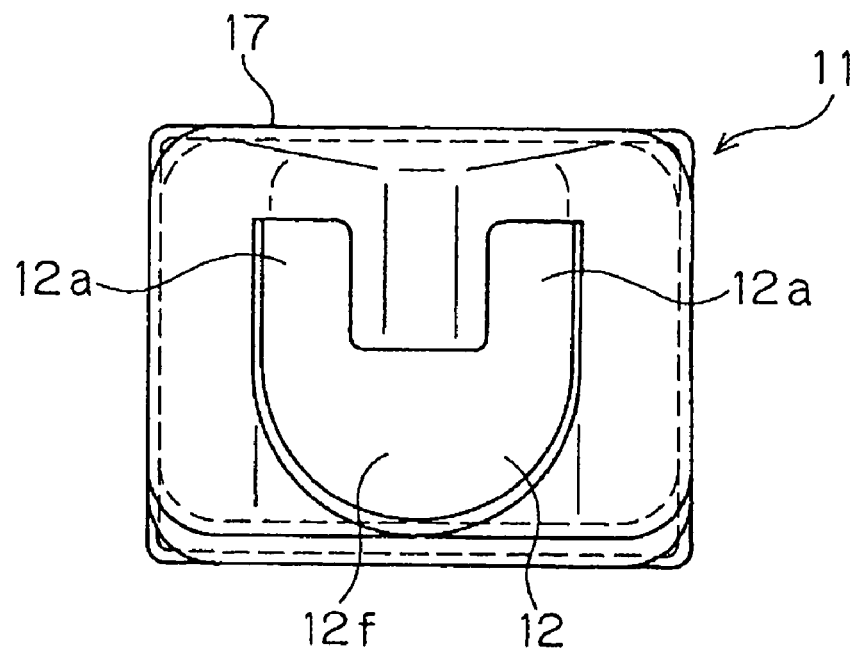
FIG. 8 is the front view of the third embodiment.
Figure 9:
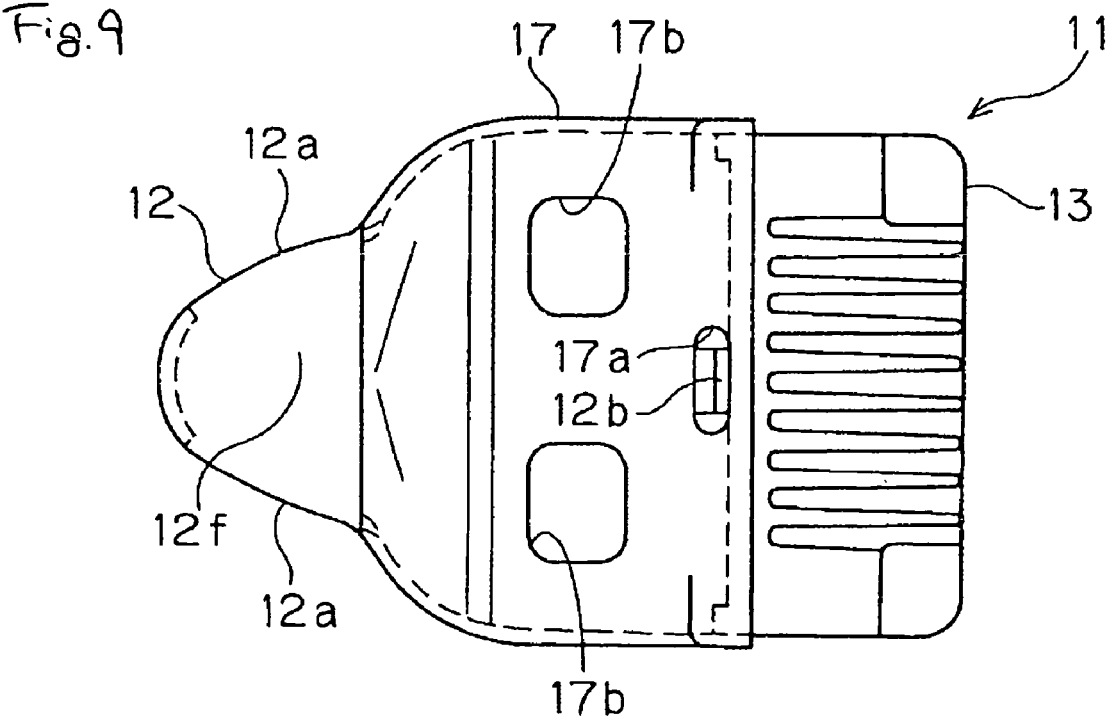
FIG. 9 is a bottom view of the third embodiment.
Figure 10:
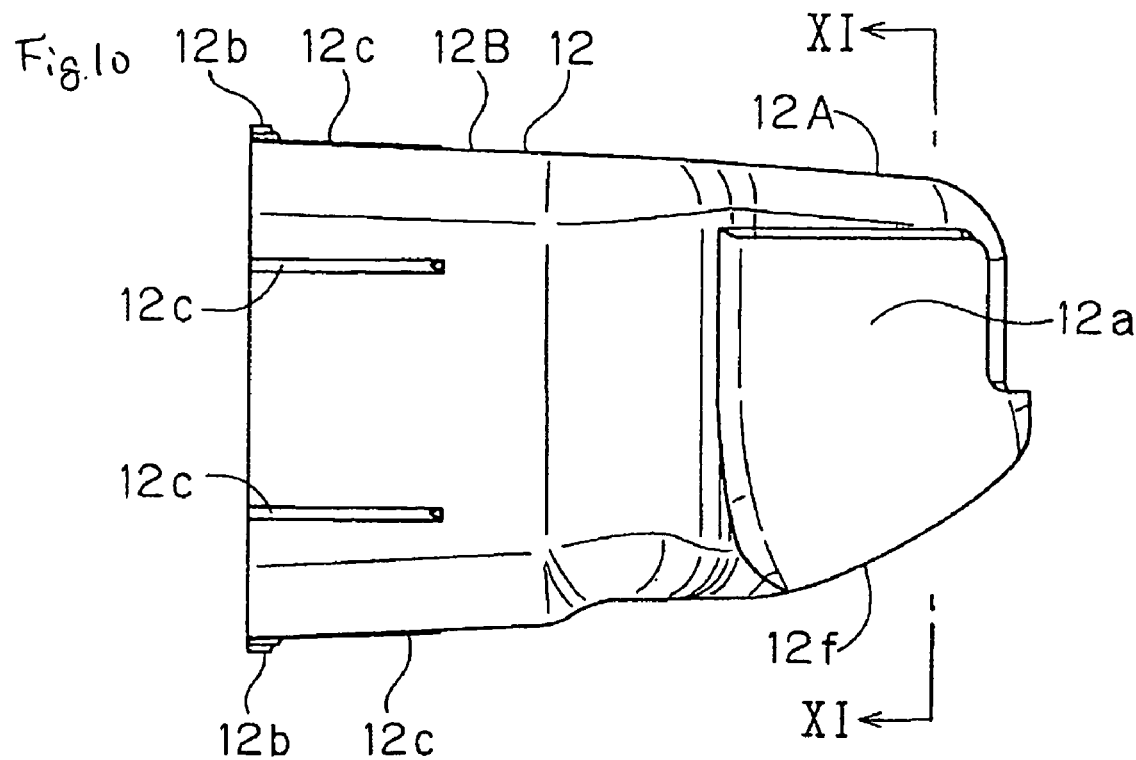
FIG. 10 is a side view of the front case member.

A cover member 17 for covering the portion of the front case member 12 other than both of the transparent windows 12a of the front case member 12, and the cover member 17 covers not only the front case member 12, but also the portion around a mating surface between the front case member 12 and the rear case member 13 (See the mating surface 6 in FIG. 7). Although the portions for covering the lower sides of the cover member 17 corresponding to the respective transparent windows 12a are not provided in the present embodiment, the configuration in which the lower side as well as the upper side are covered is also applicable.

In addition, locking projections (a first locking portion) 12b are formed respectively on the upper surface and the lower surface of the rear portion of the front case member 12 at the widthwise centers thereof, and locking holes 17a (a second locking portion) with which the respective locking projections 12b are detachably locked, are formed on the cover member 17 at the positions corresponding to the locking projections 12.

Figure 2:
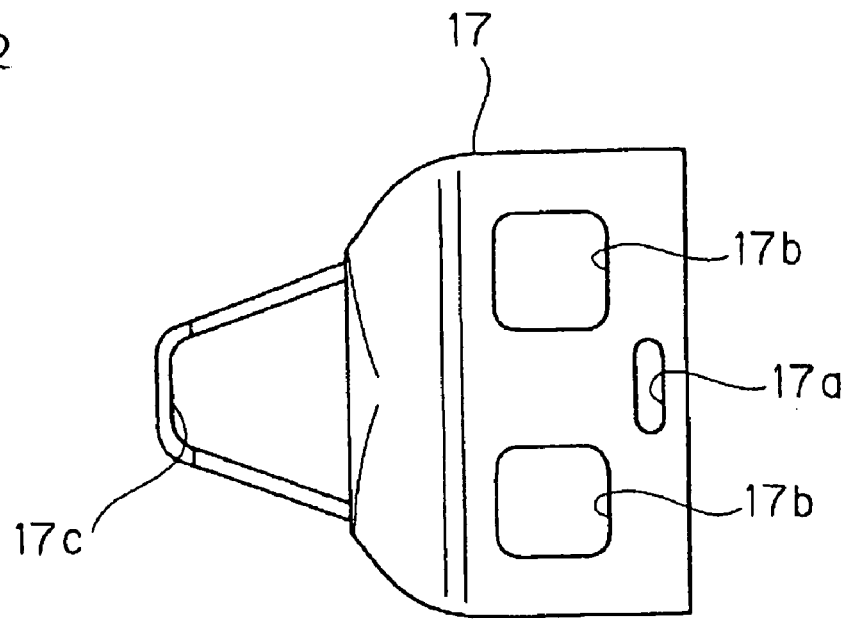
FIG. 2 is a bottom view of a cover member of the first embodiment.

As shown also in FIG. 2, an appropriate number of water drainage holes 17b of an appropriate size are formed on the lower portion of the cover member 17 corresponding to a rear half portion 12B of the front case member 12.

A plurality of rattletrap preventing ribs 12c in a shape of ridge projecting slightly toward the fitting direction of the cover member 17 are formed respectively on the upper surface, the lower surface and the left and the right surfaces of the rear half portion 12B of the front case member 12 at intervals in the circumference direction.

Figure 3:
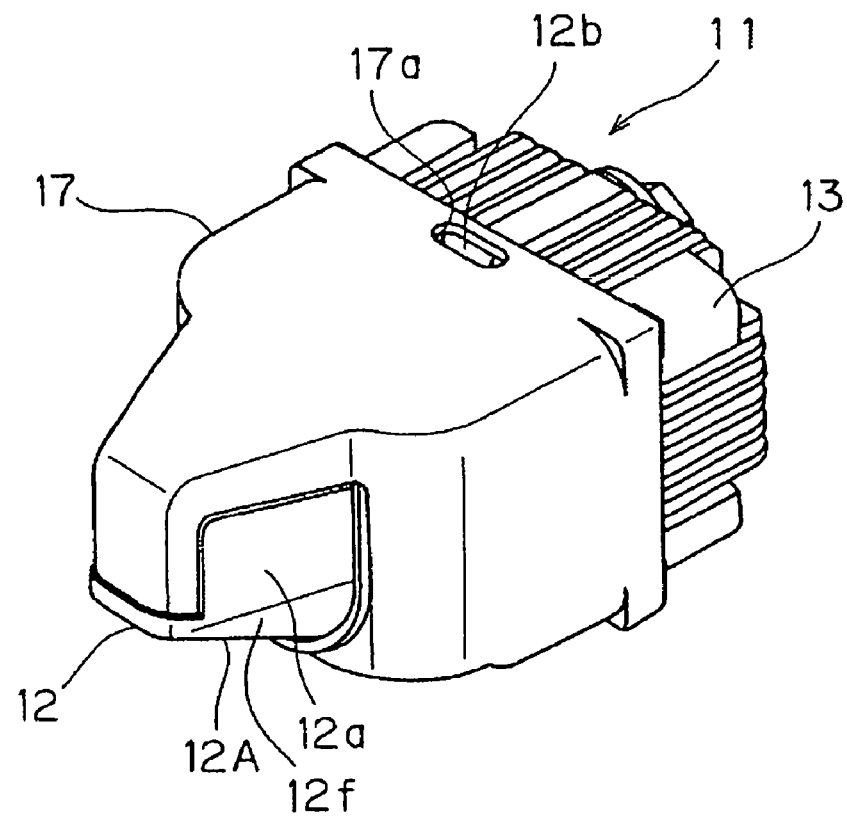
FIG. 3 is a perspective view of the first embodiment in an assembled state.
Figure 4:
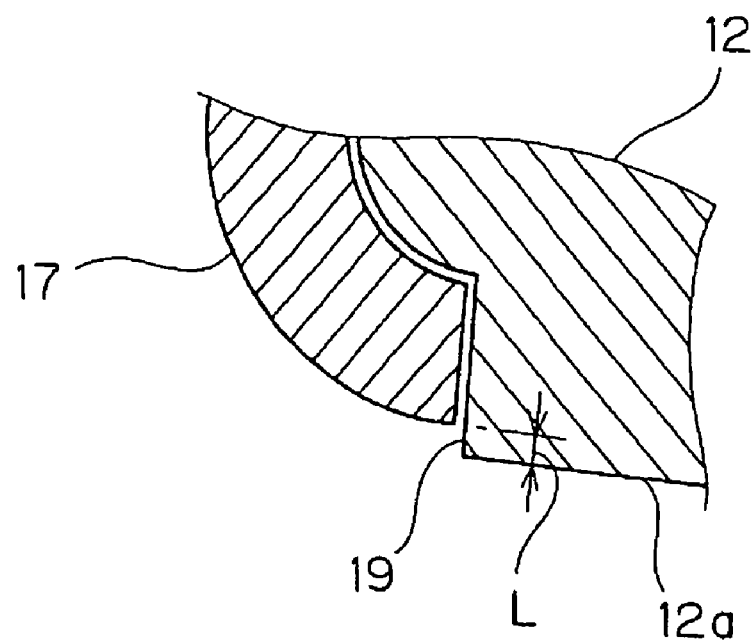
FIG. 4 is an enlarged view of the first embodiment partly in cross section.

As shown in FIGS. 3 and 4, in a state in which the cover member 17 is mounted to the case 11, the respective transparent windows 12a of the front case member 12 are projecting outwardly so as to form a step 19 from the cover member 17 at the peripheral edge thereof. The amount of outward projection L of the step 19 may be such like 0.2 mm.

An outer surface 12d of the distal end of the front case member 12 and an inner surface 17c of the distal end of the cover member 17 facing the outer surface 12d of the distal end in a state in which the cover member 17 is mounted are bonded with respect to each other via a double-faced adhesive tape 20.

The front case member 12 is molded of transparent resin, such as polycarbonate resin, and transparent and hard coating material, so-called a hardcoating material, such as UV cured acryl, is applied from the viewpoint of prevention of scratches.

The rear case member 13, being formed of material such as resin or aluminum having a light shielding property and the cover member 17, being formed of material such as ABS resin, are applied with a color coating so as to match the color of the member or the grill or the like of the vehicle.

When assembling, the front case member 12 and the rear case member 13 are joined by fastening screws 15 with the intermediary of a packing 14, the cover member 17 is slipped onto the front case member 12 from the side of the distal end of the front case member 12 and compressed until it is fitted thereto in a state in which the double-faced adhesive tape 20 is adhered on the outer surface 12d of the distal end of the front case member 12, so that the respective locking projections 12b and the respective locking holes 17a are locked with respect to each other in a retained state and the other surface of the double-faced adhesive tape 20 is adhered to the inner surface 17c of the distal end of the cover member 17.

The present embodiment is configured in this manner and has an advantage in that the front case member 12 must simply be coated with the hardcoating material and the cover member 17 must simply be coated with the color coating material since the portion which has been required to be coated with the color coating material for light shielding is configured of the separate cover member 17, and thus masking which has been required in the related art is no longer necessary and the coating operation for each member may be performed by a single process, which contributes to prevent yield loss.

In addition, since the front case member 12 and the cover member 17 must simply be coated with a single hardcoating material and a single color coating material respectively, cracking or peeling of the color coating material or the hardcoating material may effectively prevented even when they are exposed repetitively to significant variations in temperature.

Furthermore, since the periphery of the mating surface between the front case member 17 and the rear case member 13 is covered with the cover member 12, the mating surface between the front case member 12 and the rear case member 13 is prevented from being exposed directly to high-pressure water during high-pressure washing of the vehicle, and thus entering of water through the mating surface may effectively prevented, whereby achieving improvement of a waterproof property.

Since water drainage holes 17b are formed on the lower portion of the cover member 17, even when unnecessary substances such as water or oil entered into a gap between the case 11 and the cover member 17, unpreferable accumulation of such substances may be effectively prevented.

Since the attachment of the cover member 17 to the case 11 is achieved by locking mechanism between the locking projection 12b and the locking hole 17a, attachment and detachment may be performed through so-called one-touch operation, and thus replacement of the cover member 17 in the case of damage due to scratches or cracking is facilitated.

Since the plurality of rattletrap preventing ribs 12c are formed on the front case member 12, the respective rattletrap preventing ribs 12c are brought into pressure contact with the inner peripheral surface of the cover member 17, and thus occurrence of rattletrap of the cover member 17 can effectively be prevented. In this case, by bonding the outer surface 12d of the distal end of the front case member 12 and the inner surface 17c of the distal end of the cover member 17 with respect to each other with the double-faced adhesive tape 20, rattletrap of the cover member 17 can be prevented further effectively, and thus retaining force of the front case member 12 with respect to the cover member 17 may be improved.

Since the respective transparent windows 12a are projecting outwardly from the cover member 17 at the peripheral edge thereof so as to form the step 19, when wiping foreign substances, dust, or wax off, such substances are trapped in a reentrant angle of the step 19, and thus residuals on the surfaces of the transparent windows 12a may effectively be prevented.

Figure 5:
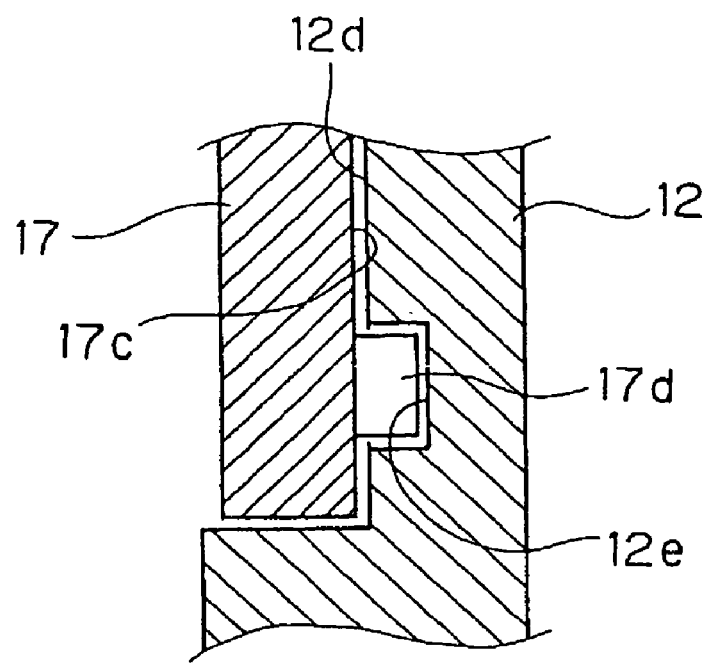
FIG. 5 is an enlarged cross sectional view of the principal portion of a second embodiment.
Figure 6:
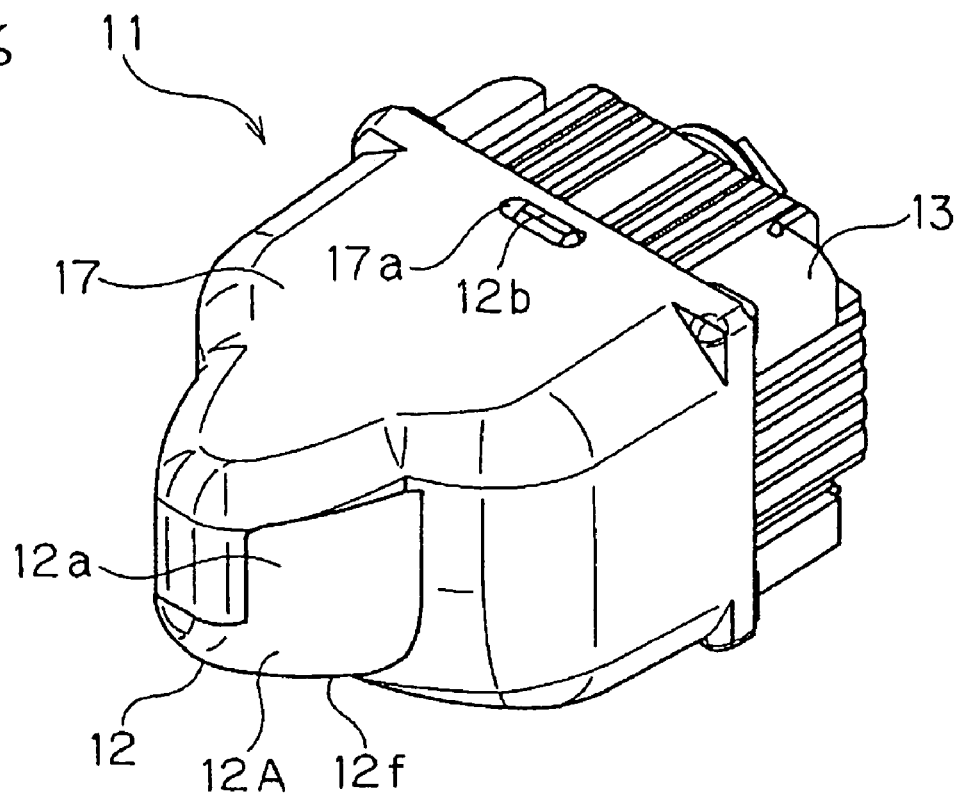
FIG. 6 is a perspective view showing a third embodiment.

FIG. 5 shows a second embodiment, in which a fitting projection 17d is provided on the inner surface 17c of the proximal end of the cover member 17 and a fitting recess 12e to which the fitting projection 17d is fitted is formed on the outer surface 12d of the proximal end of the front case member 12 at the position facing the fitting projection 17d, so that the fitting projection 17d is detachably fitted into the fitting recess 12e in a state in which the cover 17 is mounted to the case 11.

In this case as well, rattletrap of the cover member 17 can effectively be prevented, and thus a retaining force of the front case member 12 with respect to the cover member 17 is advantageously improved.

FIGS. 6 through 13 show a third embodiment, in which the same parts as in the first embodiment are represented by the same reference numerals and the description thereof will be omitted.

In the first embodiment, as shown in FIGS. 1 and 3, the transparent windows 12a are provided both on the left and the right surfaces of the front half portion 12A of the front case member 12, and the portion connecting the transparent windows 12a at the lower surface sides thereof is also capable of transmitting light beam, which constitutes a so-called transparent window 12f on the lower surface. The transparent windows 12a on both the left and the right sides each have a flat shape, and the transparent window 12f on the lower surface is formed of a curved surface which constitutes part of a conical shape.

In contrast, according to the third embodiment, the transparent window 12f connecting the transparent windows 12a at the lower surface sides thereof provided on both the left and the right surfaces of the front half portion 12A of the front case member 12 is formed of a curved surface which constitutes part of an elliptic surface obtained by revolving an ellipse about the longitudinal axis thereof, and the transparent windows 12a on the both sides are continuously extended from the upper edges thereof. In other words, the transparent windows 12a on the both sides and the transparent window 12f on the lower surface are formed respectively of curved surfaces, and connected by smooth curved surfaces with each other so that the lower edges of the respective transparent windows 12a on the both sides and the upper edges of the transparent windows 12f on the lower surface are integrally formed by a continuous curved surface.

Figure 11:
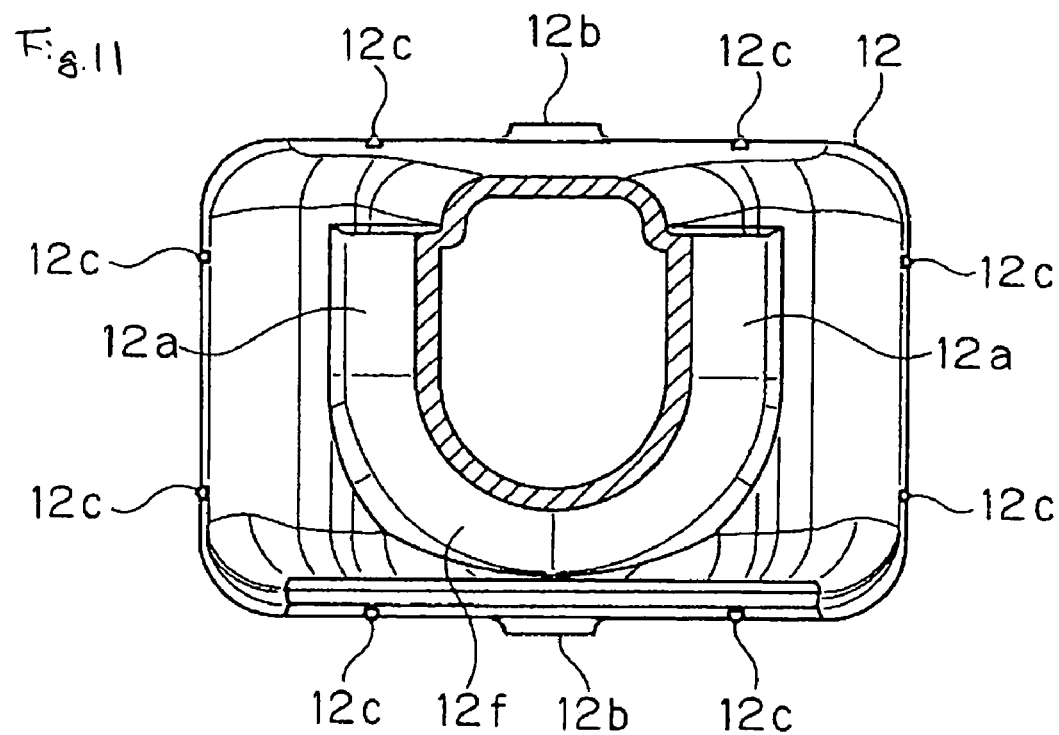
FIG. 11 is a cross-sectional view taken along the line XI-XI in FIG. 10.
Figure 12:
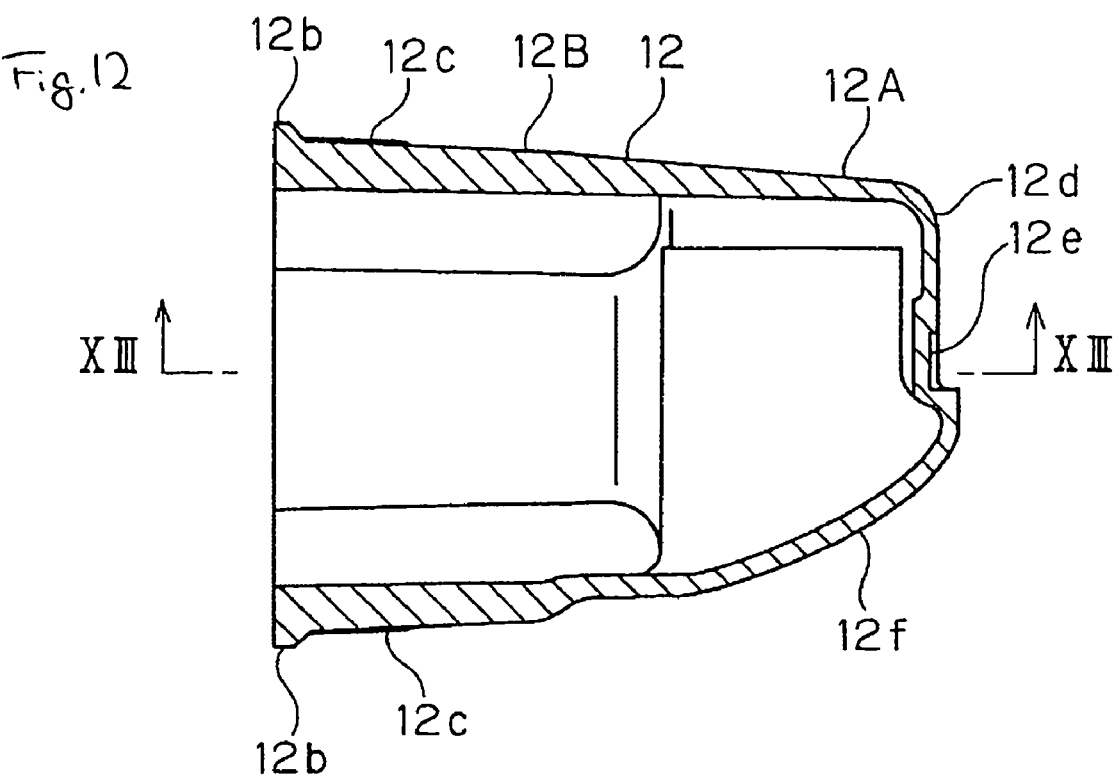
FIG. 12 is a side cross-sectional view of the front case member.
Figure 13:
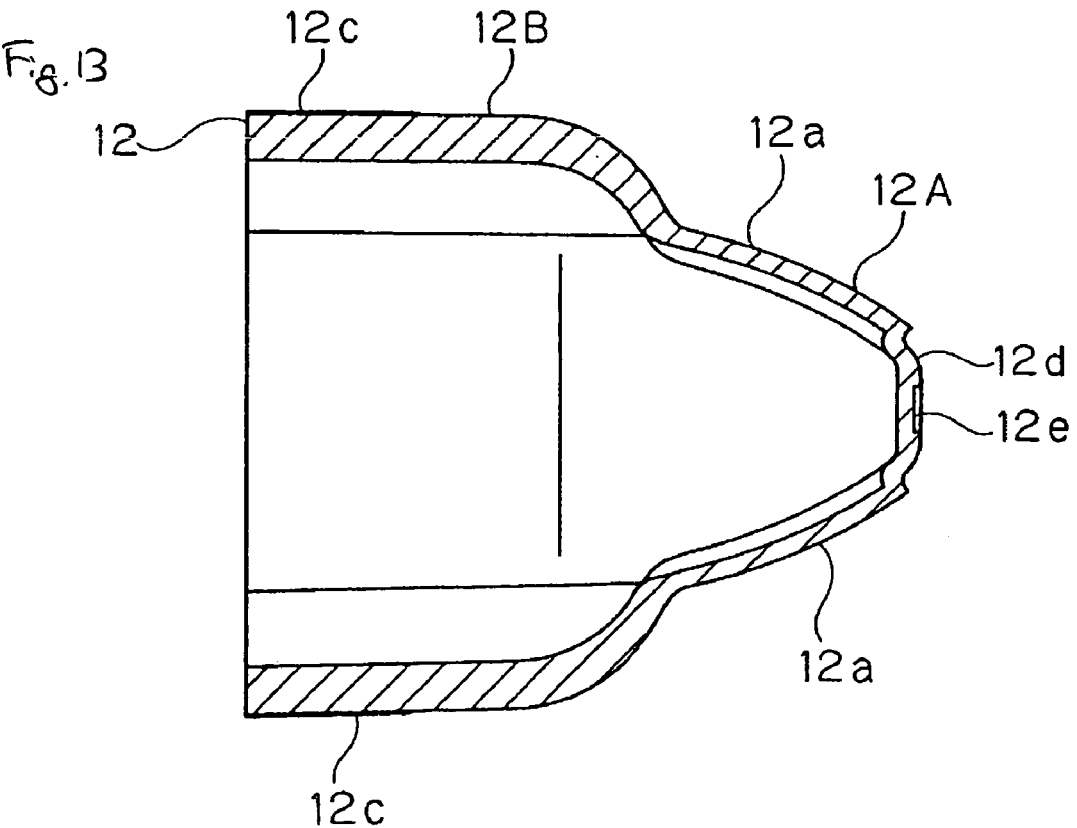
FIG. 13 is a cross-sectional view taken along the line XIII-XIII in FIG. 12.

In this case, as shown in FIGS. 11 through 13, the thickness of the transparent windows 12a and of the transparent window 12f are uniform and the same.

Other configurations are substantially the same as the first embodiment. In other words, the front case member 12 is formed of transparent resin, such as polycarbonate resin, and is coated, for example, with UV-cured acryl. The rear case member 13 is formed of a material having the light-shielding property or of aluminum material. The cover member 17 is formed, for example, of ABS resin, and is coated with a coating material which matches the colors of the member or the grill of the vehicle. The assembled configuration is also the same.

Figure 14:
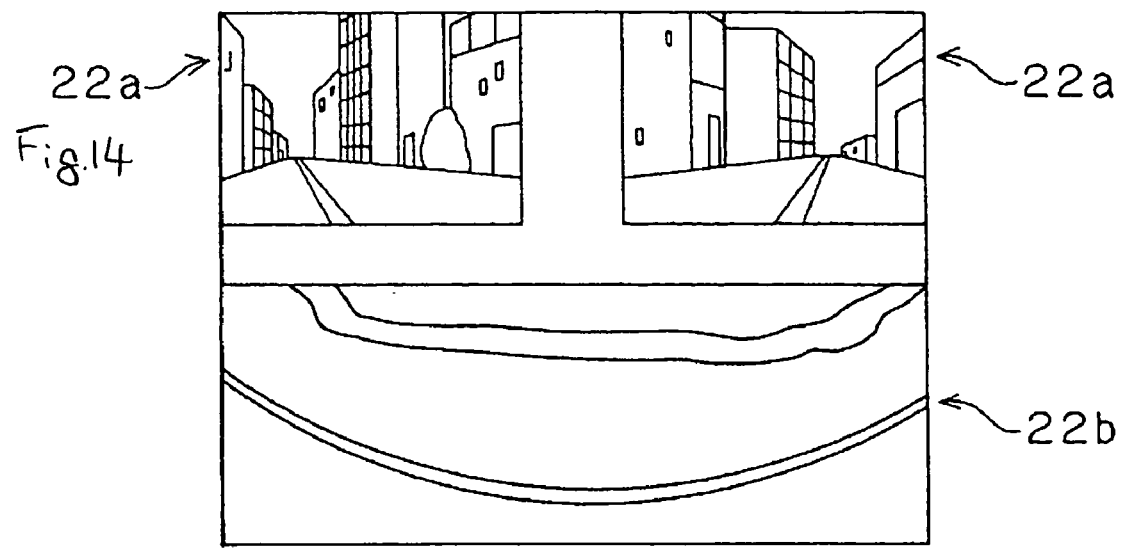
FIG. 14 is an explanatory drawing showing an image picked up according to the first embodiment.

Therefore, according to the third embodiment as well, the same effect as in the first embodiment is achieved. However, in the first embodiment, since the transparent windows 12a on both the right and the left sides are flat, and the transparent window 12f is formed of a curved surface defined by straight lines. Therefore, joint portions between the transparent windows on the both side and the transparent window 12f on the lower surface connect the flat surfaces and the curved surface. Consequently, the respective transparent windows 12a and 12f having different shapes are constrainedly connected, and hence an image 22b picked up through the transparent window 12f on the lower surface partly includes distortion due to partial distortion as shown in FIG. 14, though an image 22a picked up through the transparent windows 12a on both the left and the right sides has no defect.

Figure 15:
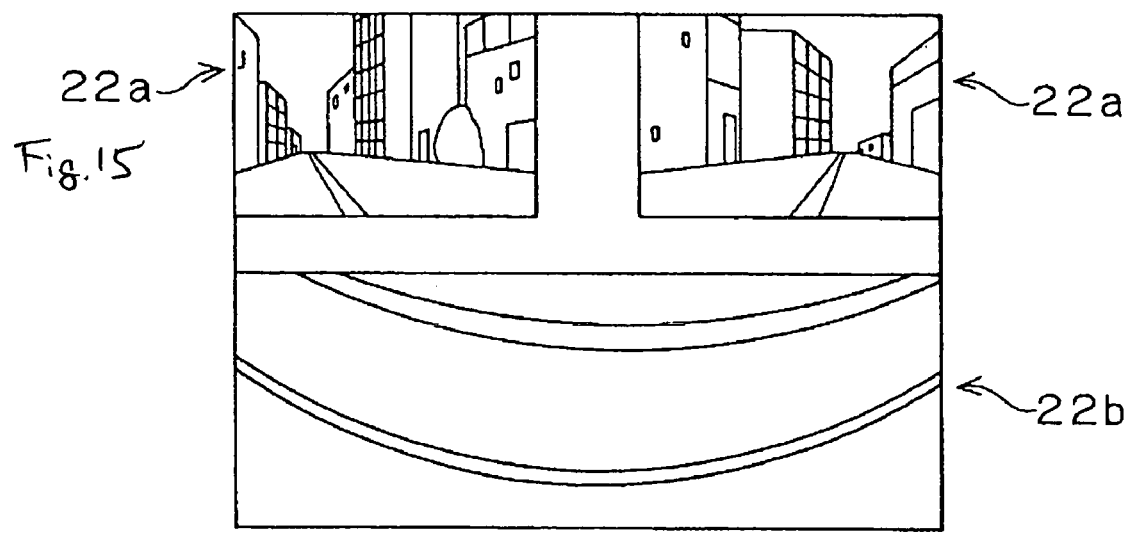
FIG. 15 is an explanatory drawing showing an image picked up according to the third embodiment.

On the other hand, according to the third embodiment, all of the transparent windows 12a on both the left and the right sides and the transparent window 12f on the lower surface have curved configuration and, in addition, have the uniform and the same thickness, and are connected by continuous smooth curved surfaces with each other. Therefore, no extreme boundary is generated at the joint portions between the transparent windows 12a and the transparent window 12f. In addition, as shown in FIG. 15, no distortion is generated not only in the image 22a picked up through the transparent windows 12a on both the left and the right sides but also in the image 22b picked up through the transparent window 12f on the lower surface, and thus an image downwardly of the vehicle may also be picked up in a favorable state, whereby improvement of the quality of the product may advantageously be achieved.

In the embodiment described above, it is also possible to employ the configuration in which the rattletrap preventing rib 12c is provided on the peripheral surface of the front case member 12 is shown. However, the configuration in which the rattletrap preventing rib is provided on the inner peripheral side of the cover member 17 may be applicable, and the configuration in which the rattletrap preventing ribs 12c are provided on both of them may.

Although the configuration, in which the through type locking hole 17a to which the locking projection 12b is fitted, is formed on the cover member 17 is shown in the above-described embodiments, a recess to which the locking projection 12b can be detachably fitted may also be applicable.

The locking projections 12b which have been formed on the front case member 12 may be formed on the rear case member.

Although the configuration in which a fitting projection 17d is provided on the cover member 17, and a fitting recess 12e is provided on the front case member 12 is shown, the configuration in which the fitting recess is provided on the cover member 17 and the fitting projection is provided on the front case member 12 is also applicable.

In addition, although the configuration in which the transparent window 12f on the lower surface is formed of a curved surface of elliptic shape is shown in the third embodiment, by employing the configuration in which the both transparent windows 12a and the transparent window 12f are connected by the continuous curved surfaces with each other, occurrence of distortion in the picked up image may be alleviated. Furthermore, when the transparent windows 12a and the transparent window 12f are formed of elliptic shaped curved surfaces continuously connected with each other, occurrence of distortion in the picked up image may be prevented further effectively. Furthermore, when the transparent windows 12a and the transparent window 12f are formed of spherical surfaces continuously connected with each other, occurrence of distortion in the picked up image may be prevented further more effectively.

As described thus far, according to the present invention, the case includes the front case member having the transparent windows and the rear case member joined and detachably fixed to the front case member, and further includes a cover member for covering the periphery of the mating surface between the front case member and the rear case member and, in addition, since the portion which has been required to be coated with the color coating material for light shielding is configured of the separate cover member, the front case member must simply be coated with the hardcoating material and the cover member must simply be coated with the color coating material. Therefore, masking, which has been required in the related art, is no longer necessary, and thus each coating process includes only a single coating procedure, yield loss as in the related art may advantageously be avoided.

In addition, since the front case member and the cover member must simply be coated with a single hardcoating material and a single color coating material respectively, cracking or peeling of the color coating material or the hardcoating material may effectively prevented even when they are exposed repetitively to significant variations in temperature.

Furthermore, since the periphery of the mating surface between the front case member and the rear case member is covered with the cover member, the mating surface between the front case member and the rear case member is prevented from being exposed directly to high-pressure water during high-pressure washing of the vehicle, and thus entering of water through the mating surface may effectively prevented, whereby achieving improvement of the waterproof property.

In addition, by providing the rattletrap preventing ribs on at least one of the outer periphery of the front case member and the inner periphery of the cover member, occurrence of rattletrap of the cover member 17 in a state in which the cover member is mounted may be prevented advantageously and effectively.

By providing the locking projection on the case and the locked portion with which the locking projection is detachably locked in a state of being mounted to the case, the attachment of the cover member to the case is achieved by locking mechanism between the locking projection and the locked portion, attachment and detachment may be performed easily and thus replacement of the cover member in the case of damage due to scratches or cracking is advantageously facilitated.

By forming the water drainage hole on the lower portion of the cover member, even when unnecessary substances such as water or oil entered into a gap between the case and the cover member, unpreferable accumulation of such substances may be effectively prevented.

By designing transparent window on the front case member so as to outwardly from the cover member and to form a step at the peripheral edge thereof in a state in which the cover member is mounted to the case, residuals such as wax on the surfaces of the transparent windows may effectively be prevented.

By employing the configuration in which a fitting projection is provided on one of the outer surface of the proximal end of the case and the inner surface of the proximal end of the cover member facing the outer surface of the proximal end of the case in a state in which the cover member is mounted, and a fitting recess to which the fitting projection is fitted is provided on the other one of them, or the configuration in which the outer surface of the distal end of the case and the inner surface of the distal end of the cover member facing the outer surface of the distal end of the cover member in a state in which the cover member is mounted are bonded with each other with the double-faced adhesive tape, rattletrap of the cover member can be prevented further effectively, and thus retaining force of the front case member with respect to the cover member may be improved.

In addition, by employing the configuration in which the transparent windows are provided on both the left and the right sides of the front case member, and a transparent window is provided on the lower surface between the both transparent windows on the both sides, both of the transparent windows on the both sides and the transparent window on the lower surface are each formed of a curved surface, the transparent window on the both sides and the transparent window on the lower surface are connected with each other by continuous curved surface, and the transparent windows on the both sides and the transparent window on the lower surface are formed into the same thickness, occurrence of distortion in the image picked up through the transparent window on the lower side may be alleviated, and the image downwardly of the vehicle may also be picked up in a favorable state, whereby improvement of the quality of the product may advantageously be achieved.

Furthermore, by employing the configuration in which the respective transparent windows on the both sides and on the lower surface are formed of a curved surfaces in an elliptic shape, occurrence of distortion in the images picked up through the respective transparent windows on the both sides and on the lower surface can be prevented further effectively, and by employing the configuration in which the respective transparent windows on the both sides and on the lower surface are formed of a curved surface in a spherical shape, occurrence of distortion in the images picked up through the respective transparent windows on the both sides and on the lower surface may be prevented further more effectively.

Although the present invention has been shown and described with reference to specific embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A vehicle periphery monitoring apparatus for picking up an image of the periphery of a vehicle, comprising:
   a case configured to be mounted on the vehicle and comprises a front case member having a transparent window and a rear case member attached to the front case member;
   an image pickup device provided within the case and configured to pick up an image of the periphery of the vehicle and to provide the image picked up into a cabin of the vehicle; and
   a cover member configured to cover the front case member except for the transparent window and to cover a periphery of a mating surface between the front case member and the rear case member.

2. The vehicle periphery monitoring apparatus as claimed in claim 1 further comprising a rattletrap preventing rib provided on at least one of an outer periphery of the front case member and an inner periphery of the cover member.

3. The vehicle periphery monitoring apparatus as claimed in claim 1 further comprising:
   a first locking portion provided on the case; and
   a second locking portion provided on the cover member and configured to be locked to the first locking member.

4. The vehicle periphery monitoring apparatus as claimed in claim 1 further comprising a water drainage hole formed on a lower portion of the cover member.

5. The vehicle periphery monitoring apparatus as claimed in claim 1, wherein the transparent window projects outward from the cover member to form a step at peripheral edge thereof.

6. The vehicle periphery monitoring apparatus as claimed in claim 1 further comprising:
   a fitting projection provided on one of an outer surface of a proximal end of the case and an inner surface of a proximal end of the cover member; and
   a fitting recess to which the fitting projection is fitted provided on the other of the outer surface and the inner surface.

7. The vehicle periphery monitoring apparatus as claimed in claim 1 further comprising an adhesive member provided between an outer surface of a distal end of the case and an inner surface of a distal end of the cover member, and configured to adhere the case and the cover member.

8. The vehicle periphery monitoring apparatus as claimed in claim 7, wherein the adhesive member comprises a double-faced adhesive tape.

9. The vehicle periphery monitoring apparatus as claimed in claim 1, wherein the transparent window comprises:
   a pair of left and right transparent window portions each provided on left and right side of the front case member, respectively; and
   a lower transparent window portion provided on lower surface between the pair of left and right transparent window portions,
   wherein the pair of left and right transparent window portions and the lower transparent window portion are each formed of a curved surface having same thickness and are integrally formed by a continuous curved surface.

10. The vehicle periphery monitoring apparatus as claimed in claim 9, wherein the pair of left and right transparent window portions and the lower transparent window portion are formed of an elliptic surface.

11. The vehicle periphery monitoring apparatus as claimed in claim 9, wherein the pair of left and right transparent window portions and the lower transparent window portion are formed of a spherical surface.

* * * * *